(12) United States Patent
Tabet et al.

(10) Patent No.: US 9,813,916 B2
(45) Date of Patent: *Nov. 7, 2017

(54) CARRIER AGGREGATION USING UNLICENSED FREQUENCY BANDS

(71) Applicant: Apple Inc., Cupertino, CA (US)

(72) Inventors: Tarik Tabet, Los Gatos, CA (US); Dawei Zhang, Saratoga, CA (US); Wen Zhao, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/384,652

(22) Filed: Dec. 20, 2016

(65) Prior Publication Data

US 2017/0105125 A1    Apr. 13, 2017

Related U.S. Application Data (63) Continuation of application No. 14/095,277, filed on Dec. 3, 2013, now Pat. No. 9,554,283.

(51) Int. Cl.
*H04W 16/14* (2009.01)
*H04W 72/04* (2009.01)

(52) U.S. Cl.
CPC ....... *H04W 16/14* (2013.01); *H04W 72/0453* (2013.01)

(58) Field of Classification Search
CPC ............. H04W 16/14; H04W 72/0453; H04W 76/025

See application file for complete search history.

(56) References Cited

U.S. PATENT DOCUMENTS

| | | |
|---|---|---|
| 2008/0220787 A1 | 9/2008 | Stanwood et al. |
| 2012/0163254 A1 | 6/2012 | Stanwood et al. |
| 2012/0250631 A1 | 10/2012 | Hakola et al. |
| 2012/0282942 A1 | 11/2012 | Uusitalo et al. |
| 2013/0083661 A1 | 4/2013 | Gupta et al. |

(Continued)

FOREIGN PATENT DOCUMENTS

| | | |
|---|---|---|
| WO | WO 2010/111150 | 9/2010 |
| WO | WO 2012/078565 | 6/2012 |

(Continued)

OTHER PUBLICATIONS

International Search Report and Written Opinion from PCT/US2014/059286, dated May 18, 2015, Apple Inc., pp. 1-5.

(Continued)

*Primary Examiner* — Habte Mered
(74) *Attorney, Agent, or Firm* — Meyertons Hood Kivlin Kowert & Goetzel, P.C.; Jeffrey C. Hood; Joel L. Stevens (57) ABSTRACT

Carrier aggregation using unlicensed frequency bands. A primary carrier for communication between a base station (BS) and a wireless user equipment (UE) device may be configured according to a first wireless communication technology. The primary carrier may be on a licensed frequency band. A secondary carrier for communication between the BS and the UE may also be configured according to a first wireless communication technology. The secondary carrier may be on an unlicensed frequency band. Channel conditions for each of multiple possible channels of the unlicensed frequency band may be assessed according to a second wireless communication technology as part of configuring the secondary carrier.

20 Claims, 5 Drawing Sheets

(56) References Cited

U.S. PATENT DOCUMENTS

| | | |
|---|---|---|
| 2013/0163447 A1 | 6/2013 | Koskela et al. |
| 2013/0195073 A1 | 8/2013 | Chen et al. |
| 2014/0010086 A1 | 1/2014 | Etemad et al. |
| 2014/0031031 A1 | 1/2014 | Gauvreau et al. |
| 2014/0043979 A1 | 2/2014 | Etemad et al. |
| 2014/0044105 A1 | 2/2014 | Bontu et al. |
| 2014/0105134 A1 | 4/2014 | Buddhikot et al. |
| 2014/0126504 A1 | 5/2014 | Jung et al. |
| 2014/0204854 A1 | 7/2014 | Freda et al. |
| 2014/0308954 A1 | 10/2014 | Wang et al. |
| 2014/0335876 A1 | 11/2014 | Ratasuk et al. |
| 2015/0065152 A1 | 3/2015 | Sadek et al. |

FOREIGN PATENT DOCUMENTS

| | | |
|---|---|---|
| WO | WO 2012/116489 A1 | 9/2012 |
| WO | WO 2012/135491 | 10/2012 |
| WO | WO 2012/162874 A1 | 12/2012 |
| WO | WO 2013/120253 | 8/2013 |
| WO | WO 2013/121250 | 9/2013 |
| WO | WO 2013/143053 A1 | 10/2013 |

OTHER PUBLICATIONS

Written Opinion of the International Searching Authority from PCT/US2014/059286, dated May 18, 2015, Apple Inc., pp. 1-9.

"Introducing LTE in Unlicensed Spectrum", 3GPP Draft; RP-131635; LTE in Unlicensed Spectrum, 3rd Generation Partnership Project (3GPP), Mobile Competence Centre; 650, Route Des Lucioles; F-06921 Sophia-Antipolis Cedex; France, no. Busan, South Korea; Dec. 3, 2013-Dec. 7, 2013 Dec. 2, 2013 (Dec. 2, 2013), XP050733706, Retrieved from the Internet: URL:http://www.3gpp.org/ftp/Meetings_3GPP SYNC/RAN/RAN/Docs/ [retrieved on Dec. 2, 2013].

Office Action, Taiwan Application No. 103136910, dated Dec. 8, 2015, 10 pages.

International Preliminary Report on Patentability, Application No. PCT/US2014/059286, dated Feb. 15, 2016, 11 pages.

Written Opinion, International Application No. PCT/US2014/059286, dated Oct. 20, 2015, 9 pages.

CARRIER AGGREGATION USING UNLICENSED FREQUENCY BANDS

PRIORITY CLAIM

The present application is a continuation of U.S. patent application Ser. No. 14/095,277, filed Dec. 3, 2013, titled "Carrier Aggregation Using Unlicensed Frequency Bands", which is hereby incorporated by reference in its entirety as though fully and completely set forth herein.

FIELD

The present application relates to wireless devices, and more particularly to a system and method for wireless devices to perform wireless communication with hybrid carrier aggregation using licensed and unlicensed frequency bands.

DESCRIPTION OF THE RELATED ART

Wireless communication systems are rapidly growing in usage. Additionally, there exist numerous different wireless communication technologies and standards. Some examples of wireless communication standards include GSM, UMTS (WCDMA), LTE, LTE Advanced (LTE-A), 3GPP2 CDMA2000 (e.g., 1×RTT, 1×EV-DO, HRPD, eHRPD), IEEE 802.11 (WLAN or Wi-Fi), IEEE 802.16 (WiMAX), Bluetooth, and others.

In some wireless communication systems, such as certain cellular communication networks, wireless communication is performed on frequency bands which have been licensed (e.g., by a cellular network provider). Additionally, in some wireless communication systems, such as Wi-Fi and Bluetooth wireless communication systems, wireless communication is performed on unlicensed frequency bands, such as the 2.4 GHz ISM frequency band.

SUMMARY

Embodiments are presented herein of methods for configuring wireless devices to perform wireless communication with hybrid carrier aggregation using licensed and unlicensed frequency bands, and of devices configured to implement the methods.

According to the techniques described herein, a wireless device may communicate with a base station according to a first wireless communication, such as LTE, to establish a primary carrier, which may be used for control communications, data communications, etc. The primary carrier may be established on a licensed frequency band.

Additionally, the wireless device may communicate with the base station according to the same wireless communication technology to establish a secondary carrier. The secondary carrier may be established on an unlicensed frequency band. The secondary carrier may be used for data communications, though control communications relating to the secondary carrier may be performed via the primary carrier.

Since the secondary carrier may be established on an unlicensed frequency band, the base station and the wireless device may take certain steps to avoid and/or deter interference. For example, the base station might assess channel conditions for each of multiple channels of the unlicensed frequency band according to a second wireless communication technology, such as Wi-Fi. The base station may then select a channel for the secondary carrier based on the channel condition assessments.

In some cases, one or both of the base station or the wireless device may additionally employ contention control techniques according to the second wireless technology when communicating on the secondary carrier. For example, Wi-Fi clear-to-send (CTS) messages might be transmitted prior to communicating on the secondary carrier in some instances.

The techniques described herein may be implemented in and/or used with a number of different types of devices, including but not limited to cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings, in which.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 1:
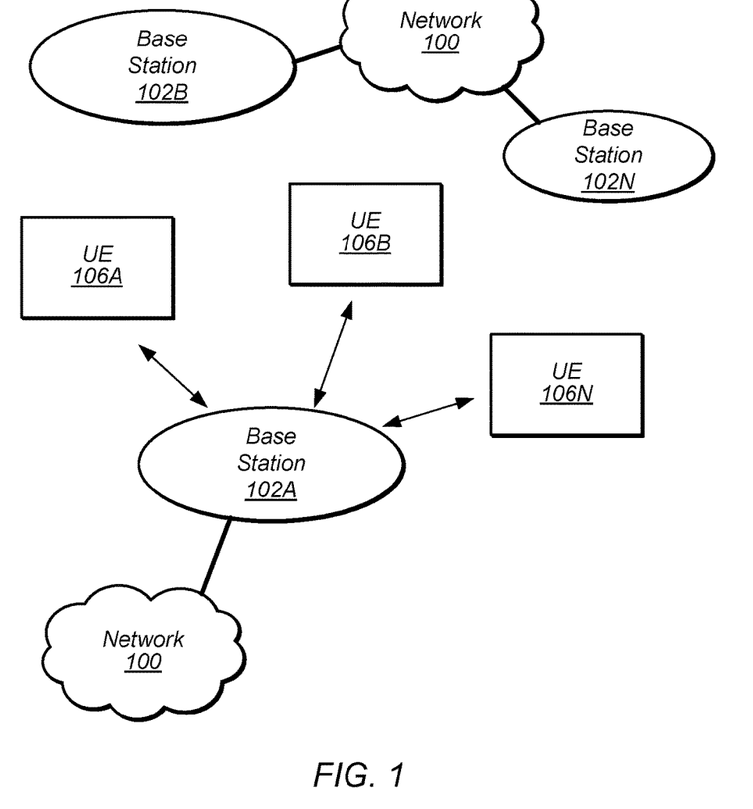
FIG. 1 illustrates an exemplary (and simplified) wireless communication system.
Figure 2:
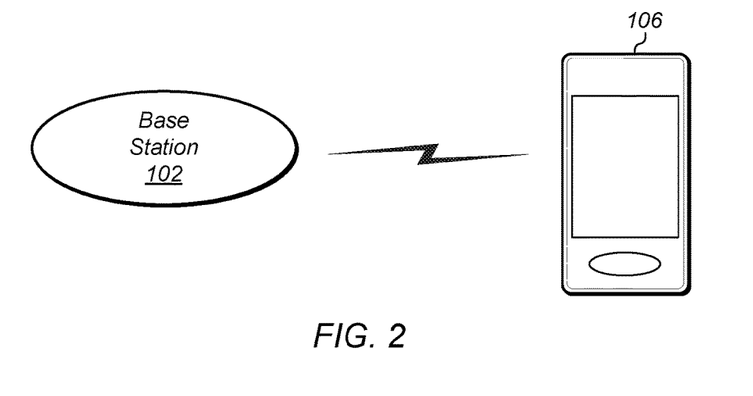
FIG. 2 illustrates a base station (BS) in communication with a user equipment (UE) device.

FIGS. 1 and 2—Communication System

FIG. 1 illustrates an exemplary (and simplified) wireless communication system. It is noted that the system of FIG. 1 is merely one example of a possible system, and embodiments of the invention may be implemented in any of various systems, as desired.

As shown, the exemplary wireless communication system includes a base station 102A which communicates over a transmission medium with one or more user devices 106A, 102B, etc., through 106N. Each of the user devices may be referred to herein as a "user equipment" (UE). Thus, the user devices 106 are referred to as UEs or UE devices.

The base station 102A may be a base transceiver station (BTS) or cell site, and may include hardware that enables wireless communication with the UEs 106A through 106N. The base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (WCDMA, TD-SCDMA), LTE, LTE-Advanced (LTE-A), 3GPP2 CDMA2000 (e.g., 1×RTT, NEV-DO, HRPD, eHRPD), Wi-Fi, WiMAX etc.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a wide geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

Note that a UE 106 may be capable of communicating using multiple wireless communication standards. For example, a UE 106 might be configured to communicate using two or more of GSM, UMTS, CDMA2000, WiMAX, LTE, LTE-A, WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates user equipment 106 (e.g., one of the devices 106A through 106N) in communication with a base station 102 (e.g., one of the base stations 102A through 102N). The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

In some embodiments, the UE 106 may be configured to communicate using any of multiple radio access technologies/wireless communication protocols. For example, the UE 106 may be configured to communicate using two or more of GSM, UMTS, CDMA2000, LTE, LTE-A, WLAN/Wi-Fi, or GNSS. Other combinations of wireless communication technologies are also possible.

The UE 106 may include one or more antennas for communicating using one or more wireless communication protocols. In some embodiments, the UE 106 may share one or more parts of a receive and/or transmit chain between multiple wireless communication standards. The shared radio may include a single antenna, or may include multiple antennas (e.g., for MIMO) for performing wireless communications. Alternatively, the UE 106 may include separate transmit and/or receive chains (e.g., including separate antennas and other radio components) for each wireless communication protocol with which it is configured to communicate. As a further alternative, the UE 106 may include one or more radios which are shared between multiple wireless communication protocols, and one or more radios which are used exclusively by a single wireless communication protocol. Other configurations are also possible.

Figure 3:
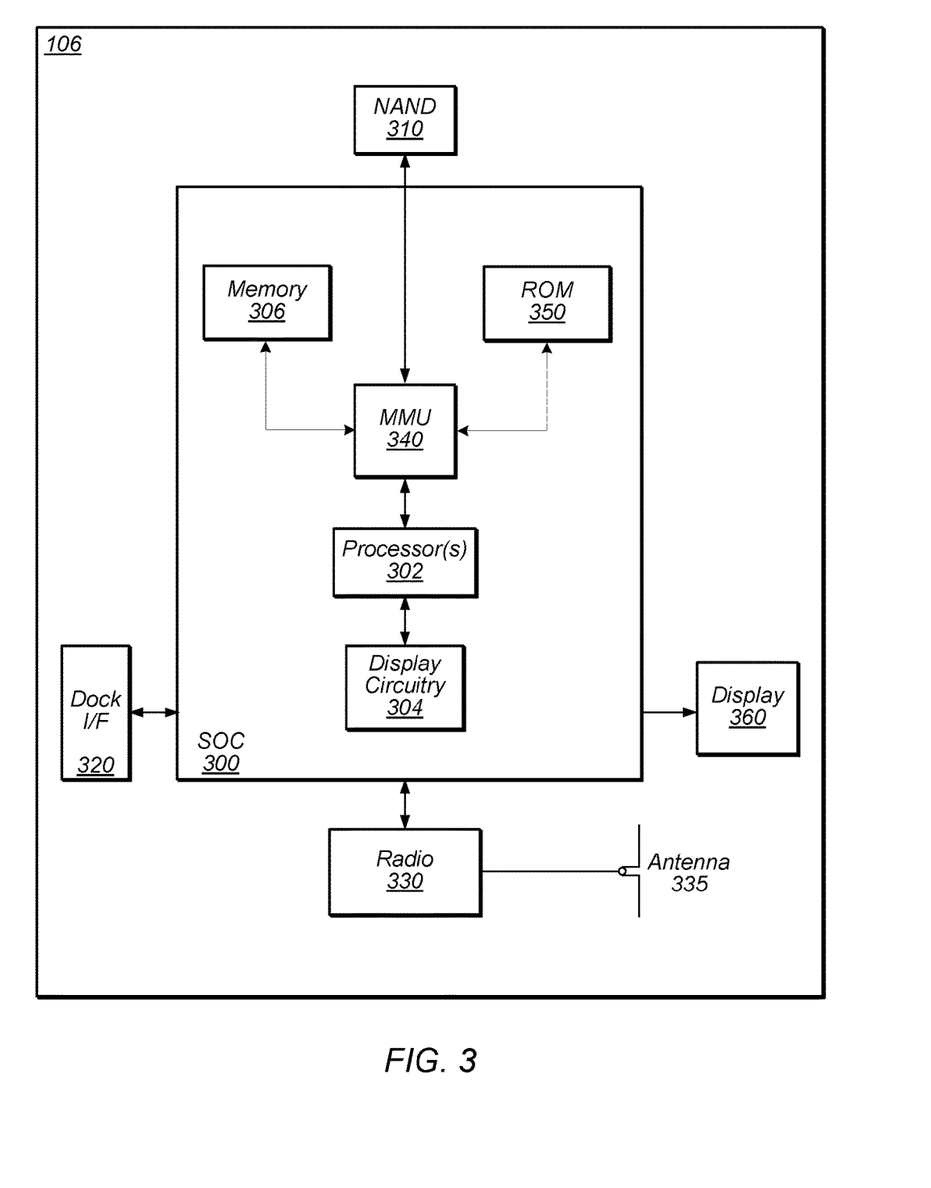
FIG. 3 illustrates an exemplary block diagram of a UE.

FIG. 3—Exemplary Block Diagram of a UE

FIG. 3 illustrates an exemplary block diagram of a UE 106. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry (e.g., radio) 330 (e.g., for LTE, Wi-Fi, GPS, etc.).

The UE device 106 may include at least one antenna, and in some embodiments multiple antennas, for performing wireless communication with base stations and/or other devices. For example, the UE device 106 may use antenna 335 to perform the wireless communication. As noted above, the UE 106 may be configured to communicate wirelessly using multiple wireless communication standards in some embodiments.

As described further subsequently herein, the UE 106 may include hardware and software components for implementing features for carrier aggregation using both licensed and unlicensed frequency bands, such as those described herein with reference to, inter alia, FIG. 7. The processor 302 of the UE device 106 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit). Alternatively (or in addition) the processor 302 of the UE device 106, in conjunction with one or more of the other components 300, 304, 306, 310, 320, 330, 335, 340, 350, 360 may be configured to implement part or all of the features described herein, such as the features described herein with reference to, inter alia, FIG. 7.

Figure 4:
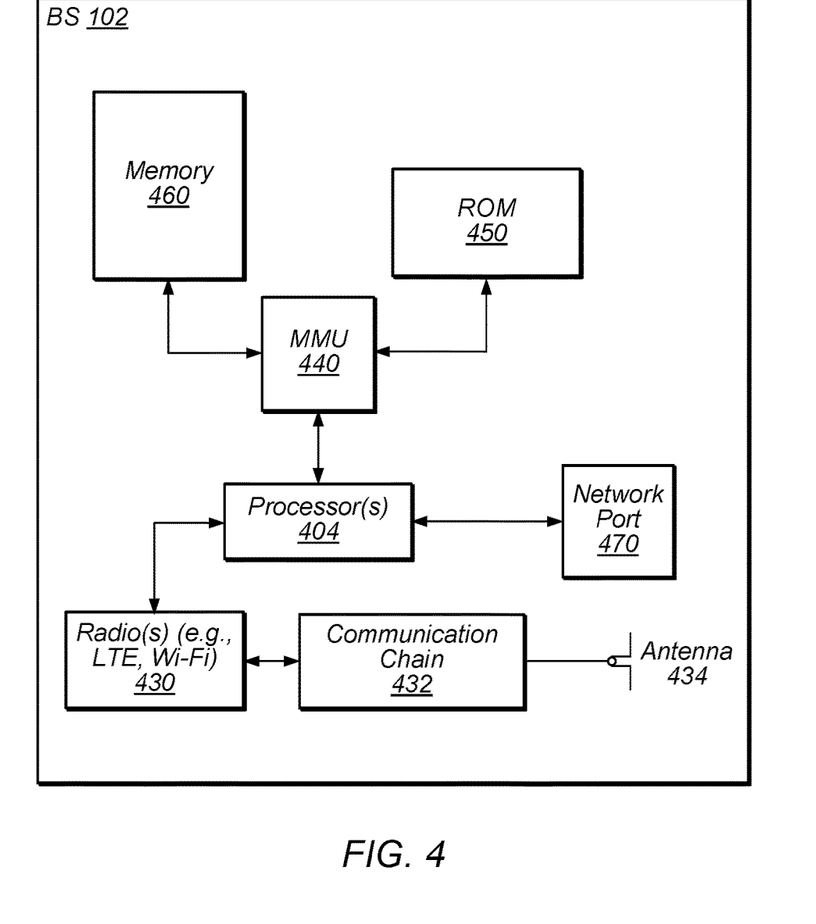
FIG. 4 illustrates an exemplary block diagram of a BS.

FIG. 4—Exemplary Block Diagram of a Base Station

FIG. 4 illustrates an exemplary block diagram of a base station 102. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless telecommunication standards, including, but not limited to, LTE, LTE-A, UMTS, CDMA2000, Wi-Fi, etc.

The BS 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and Wi-Fi).

Such capabilities may be particularly useful for managing interference and coordinating communication on unlicensed frequency bands, e.g., on which wireless communication according to multiple wireless communication technologies may be possible (and possibly even common), which the BS 102 may be configured to do. For example, as described further subsequently herein, the BS 102 may include hardware and software components for implementing features for carrier aggregation using both licensed and unlicensed frequency bands, such as those described herein with reference to, inter alia, FIG. 7. The processor 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement part or all of the features described herein, such as the features described herein with reference to, inter alia, FIG. 7.

Figure 5:
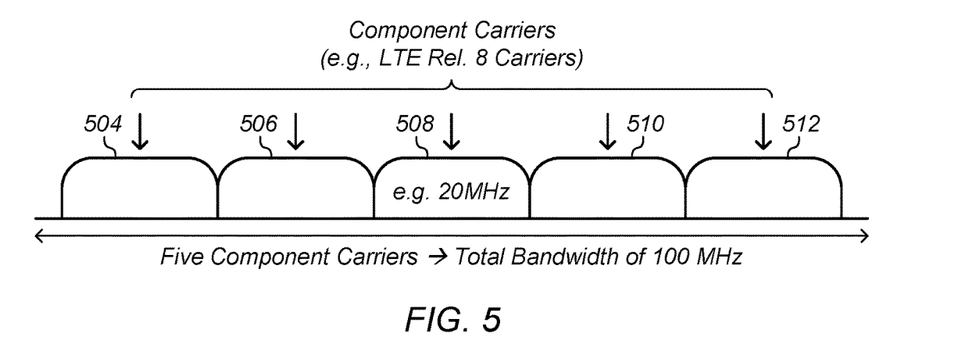
FIG. 5 illustrates an exemplary carrier aggregation scheme.

FIG. 5—Carrier Aggregation

Carrier aggregation is a scheme in which multiple carriers (e.g., frequency channels) may be used for wireless communication with a UE according to a wireless communication technology. FIG. 5 illustrates one exemplary carrier aggregation scheme (e.g., which may be used in accordance with the LTE radio access technology) which may be used in accordance with other aspects of this disclosure, such as with respect to the method of FIG. 7.

In the illustrated scheme, up to five component carriers (carriers 504, 506, 508, 510, 512) may be aggregated for a single user device (such one of the UEs 106 illustrated in and described with respect to FIGS. 1-3). Each component carrier may use a channel width of up to 20 MHz. As one possibility, each component carrier may be an LTE release 8 carrier. Thus, according to the exemplary scheme, a UE may be allocated up to 100 MHz of bandwidth. In many instances, such a carrier aggregation scheme may enable a UE participating in it with greater throughput than without such a scheme.

In many cases, component carriers may utilize adjacent frequency channels. However, it should be noted that it is also possible to implement carrier aggregation utilizing non-continuous frequency channels, potentially including non-continuous frequency channels within the same frequency band, and/or frequency channels within different frequency bands. For example, according to the method of FIG. 7, it may be possible to implement carrier aggregation using a frequency channel in a licensed frequency band as one component carrier, and a frequency channel in an unlicensed frequency band as another component carrier.

It should be noted that while the exemplary scheme illustrated in FIG. 5 and the associated description are provided by way of example as one possible manner of implementing carrier aggregation, they are not intended to be limiting to the disclosure as a whole. Numerous alternatives to and variations of the details thereof are possible and should be considered within the scope of the present disclosure. For example: carrier aggregation schemes may be implemented in conjunction with other wireless communication technologies; carriers according to other LTE releases or other radio access technologies altogether may be used; carriers having different channel widths may be used; different numbers of component carriers may be supported; and/or any of numerous other alternatives to and variations of the illustrated scheme are also possible.

Figure 6:
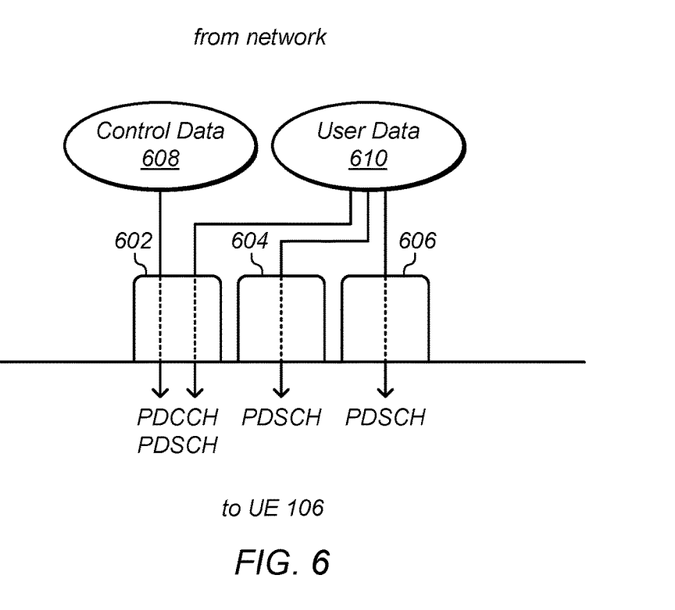
FIG. 6 illustrates an exemplary cross-carrier scheduling scheme.

FIG. 6—Cross-Carrier Scheduling

For systems which implement carrier aggregation, various control schemes/mechanisms are possible. As one possibility, an independent cell may be implemented on each component carrier, for example by providing a control channel with data scheduling and other control features for each cell on the component carrier for that cell. As another possibility, some or all control functions may be centralized. For example, a "primary cell" might be implemented on one component carrier, while "secondary cells" might be implemented on any additional component carriers, such that some or all control information for the secondary cells is communicated by way of the primary cell.

Such a scheme may be referred to as "cross-carrier scheduling", and FIG. 6 illustrates one such exemplary scheme (e.g., which may be used in accordance with the LTE radio access technology). It should be noted that while the exemplary scheme illustrated in FIG. 6 and the associated description are provided by way of example as one possible manner of implementing a cross-carrier scheduling mechanism, they are not intended to be limiting to the disclosure as a whole. Numerous alternatives to and variations of these exemplary details are possible and should be considered within the scope of the present disclosure.

As shown, in the exemplary scheme a user device (e.g., a UE 106 such as illustrated in and described with respect to FIGS. 1-3) may have three active carriers as part of its connection to a network (e.g., by way of one or more base stations 102 such as illustrated in and described with respect to FIGS. 1-2 and 4), which may be implemented as a primary cell 602 and two secondary cells 604, 606. The network may provide control data 608 (e.g., for scheduling user data communications, performing mobility related functions, etc.) for all three cells by way of a control channel of the primary cell 602. For example, the control data 608 may be communicated by way of a physical downlink control channel (PDCCH) of the primary cell 602.

The network may provide user data 610 (e.g., application data for networking applications such as web browser applications, email applications voice call applications, video chat applications, game applications, etc.) to the UE 106 on any or all of the cells 602, 604, 606. For example, various portions of the user data 610 may be communicated by way of a physical downlink shared channel (PDSCH) of each of the primary cell 602 and the secondary cells 604, 606.

Thus, cross-carrier scheduling may be used in conjunction with carrier aggregation to centralize (at least a portion of) control communications on one cell. This technique may be used in many instances for infrastructure mode communications between a UE and a network, such as illustrated in the exemplary scheme of FIG. 6. Such a technique may be particularly useful if different component carriers are known and/or expected to have different interference levels, since in such a case the carrier having the lowest interference level may advantageously be used for high priority control data. Such a situation may be the case, for example, if, as in the method of FIG. 7, one component carrier is on a licensed frequency band for which the potential for interference is substantially limited to that caused by network controlled wireless communication, while another component carrier is on an unlicensed frequency band which may be subject to interference caused by wireless communication which is not under network control.

Figure 7:
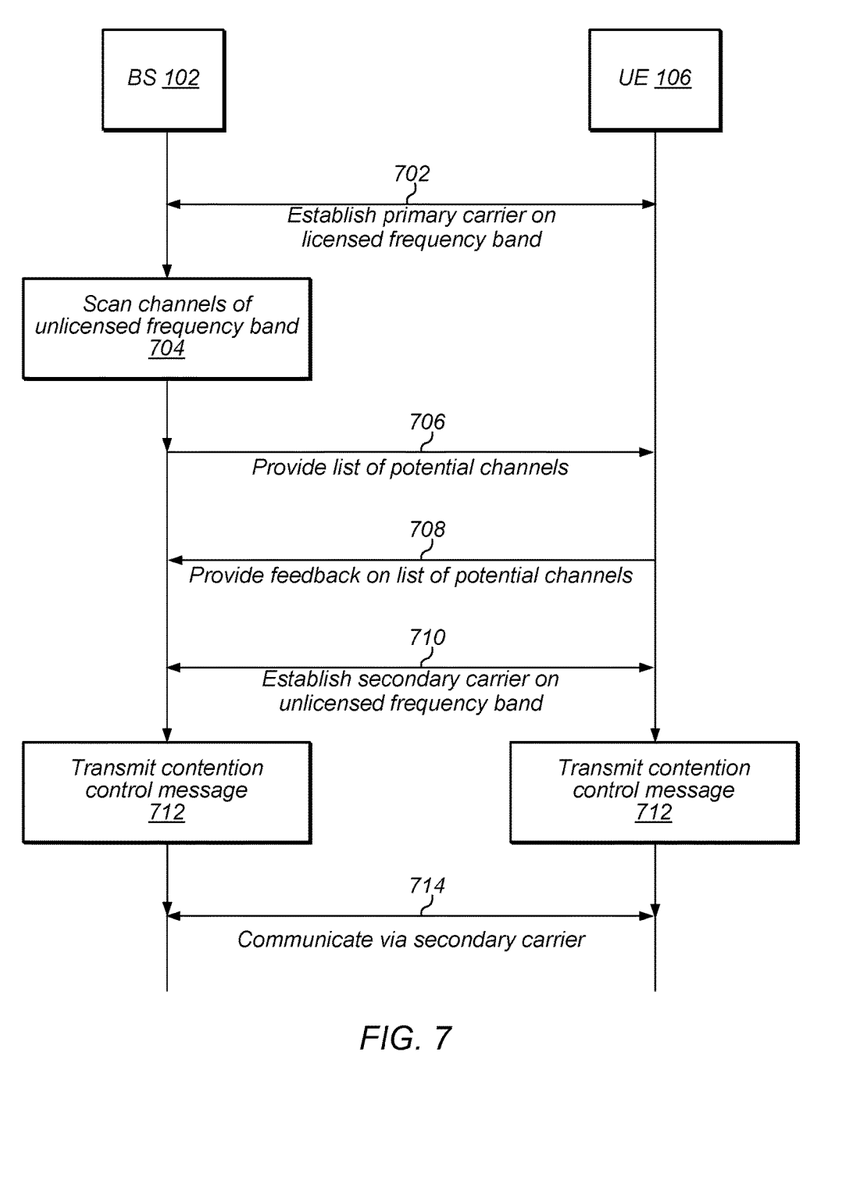
FIG. 7 is a flowchart diagram illustrating an exemplary method for carrier aggregation using unlicensed frequency bands.

FIG. 7—Communication Flow Diagram

FIG. 7 is a communication/signal flow diagram illustrating a scheme for hybrid carrier aggregation using both licensed and unlicensed frequency bands. The scheme shown in FIG. 7 may be used in conjunction with any of the computer systems or devices shown in the above Figures, among other devices. As shown, according to the scheme a BS 102 (e.g., such as illustrated in and described with respect to FIGS. 1-2 and 4) may provide a UE 106 (e.g., such as illustrated in and described with respect to FIGS. 1-3) with a carrier aggregation communication link having component carriers in both licensed and unlicensed frequency bands.

In various embodiments, some of the elements of the scheme shown may be performed concurrently, in a different order than shown, or may be omitted. Additional elements may also be performed as desired. As shown, the scheme may operate as follows.

In 702, the BS 102 may establish (e.g., configure) a primary carrier (or "primary cell") with the UE 106. The primary carrier may be established according to a first wireless communication technology (or "radio access technology" or "RAT"), such as LTE. The primary carrier may be established on a particular ("first") channel (e.g., a frequency channel).

The first channel may be a channel be in a licensed frequency band, which may also be referred to herein as a "first frequency band". For example, a cellular network provider may have licensed a particular frequency band (possibly specifically for use in conjunction with a particular radio access technology, such as LTE-A, LTE, WCDMA, CDMA2000, GSM, etc.), and may provide a cellular network which operates primarily within that licensed frequency band. Such a licensed frequency band may be subject to less external interference than an unlicensed frequency band. For example, an unlicensed frequency band might be subject to interference from other wireless communication technologies and/or from other cellular network operators utilizing a similar or the same wireless communication technology in the unlicensed frequency band, whereas a licensed frequency band may not be subject to such external interference sources, e.g., if the licensed frequency band is licensed for the exclusive use of one particular cellular network provider.

The primary carrier may provide the UE 106 with an infrastructure mode type communication link to a cellular network. Thus, the primary carrier may provide a connection to a core network, e.g., of a cellular service provider, with which a user of the UE 106 may have a subscription and/or other agreement to provide cellular service. The cellular network may thus provide connectivity between the user device and various services and/or devices coupled to the cellular network, such as other user devices, a public switched telephone network, the Internet, various cloud-based services, etc. The primary carrier may be used for control communications between the UE 106 and the BS 102, and may also be used for data (e.g., user data) communications.

Note that as part of such a cellular network, the base station 102 may operate in conjunction with numerous other base stations (which may provide other cells) and other network hardware and software to provide continuous (or nearly continuous) overlapping wireless service over a wide geographic area. At least in some instances, the UE 106 may select a cell with the BS 102 to establish as the primary cell from among multiple cells within wireless communication range of the UE 106, which may be provided by nearby base stations. For example, the UE 106 may be capable of discovering, detecting signals from, and possibly communicating with some or all of multiple neighboring cells, e.g., depending on signal strength/quality, permission, technological interoperability, etc. The primary cell may be selected and configured/established on the basis of one or more signal strength and/or signal quality measurements of the primary cell and/or other nearby cells, among other possible criteria (e.g., wireless traffic congestion of the cell(s), operator of the cell(s), wireless technology according to which the cell(s) operate, etc.).

Note further that cell selection may be an initial cell selection, e.g., upon powering on the UE 106 (or possibly after powering on a radio of the UE 106, e.g., upon exiting a limited-operation or "airplane mode"), according to some embodiments. Alternatively, the cell selection may be part of a cell re-selection procedure. For example, the UE 106 might perform a cell re-selection procedure to select a new cell with better signal strength and/or quality as a primary cell based on experiencing degraded signal strength and/or quality on a previous primary cell, e.g., as a result of moving from a service area of the previous primary cell to a service area of the new primary cell.

In 704, the BS 102 may scan channels of an unlicensed ("second") frequency band, such as an industrial-scientific-medical (ISM) frequency band, e.g., for interference. As previously noted, since unlicensed frequency bands may be subject to interference from other wireless communication (e.g., potentially from one or more other wireless communication technologies) which is not under network control, it may be desirable to determine how much interference is currently present on each of the channels in the unlicensed frequency band prior to selecting one for use as a secondary carrier.

In particular, at least in some instances it may be desirable to check for Wi-Fi interference, e.g., if the unlicensed frequency band is one in which Wi-Fi communication is known to be performed. Thus the BS 102 may scan one or more Wi-Fi channels on the unlicensed frequency band. The BS 102 may be equipped with (or coupled to and in control of) Wi-Fi communication circuitry (e.g., may be configured to act as a Wi-Fi access point, or may be coupled to and control a Wi-Fi access point) specifically for such a purpose (and/or for other purposes), if desired. Scanning the Wi-Fi channels may include measuring any of various channel condition metrics and/or metrics which may be used to gauge or infer interference levels, such as RSSI. As one possibility, the BS 102 may perform power spectrum density detection on such an unlicensed frequency band.

Based on scanning the Wi-Fi channels, the BS 102 may select one or more channels (e.g., Wi-Fi channels, or channels according to the first wireless communication technology (such as LTE channels) which may correspond/overlap in frequency with one or more of the Wi-Fi channels) in the unlicensed frequency band as potential channels on which to establish a secondary carrier. The selected channel(s) may be those on which Wi-Fi interference has been determined to be less likely and/or prevalent, such as channels for which RSSI are below a desired threshold.

Having selected one or more channels as potential secondary carriers, the BS 102 may provide an indication of such channels to the UE 106. For example, the BS 102 may generate and provide a list of potential channels in the unlicensed frequency band to the UE 106 in a configuration message (e.g., an RRC configuration object) via the primary cell. The UE 106 may store such a list of potential channels and configure each channel on the list as a potential carrier, though each remain 'inactive' and unused as an actual carrier until more explicitly activated.

In 708, the UE 106 may additionally provide feedback to the BS 102 (e.g., via the primary cell) with respect to such a list of potential channels in the unlicensed frequency band. For example, the UE 106 may perform one or more measurements (e.g., on interference/signal strength/RSSI scans/ any of various other channel condition metrics) on some or all of the potential channels to determine channel conditions for those channels local to the UE 106, e.g., to confirm that those channels are also relatively free of interference in the vicinity of the UE 106. As another example, the UE 106 may have limits to its wireless communication capabilities, as a result of which it may not be possible to perform communications according to the first wireless communication technology on a particular frequency band, potentially including one or more of the potential channels indicated by the BS 102. Thus, the UE 106 might provide channel condition information, a pruned (or unpruned) list of supported channels, a list of unsupported channels, and/or any of various other forms of feedback to the BS 102 with respect to the list of potential channels in the unlicensed frequency band.

Once any scanning/channel measurements have been performed by the BS 102, and possibly based additionally on any feedback received from the UE 106, then the BS 102 may select a ("second") channel on which to establish the secondary carrier. The selection may be based on one or more of the scanning/channel measurements, any feedback received from the UE 106, and/or network resource allocation considerations (e.g., known loading/use of network controlled communications, resource availability, etc.), among various possibilities.

In 710, a secondary carrier may be established on the unlicensed frequency band. The secondary carrier may be established on the selected "second" channel. The BS 102 may activate the secondary carrier by providing an indication the UE 106 to establish the secondary carrier on the second channel, e.g., via a configuration message (such as a "Scell Add" configuration message in LTE) transmitted on the primary carrier. Note that the secondary carrier may, like the primary carrier, be established according to the first wireless communication technology.

In some instances, the cellular network may utilize cross-carrier scheduling to schedule/allocate secondary cell resources to the UE 106. For example, the BS 102 may provide scheduling information (e.g., uplink and/or downlink grants) for scheduling secondary cell resources the UE 106 via the primary carrier. Using cross-carrier scheduling may enable the network to keep control communications on the licensed frequency band, which as previously noted with respect to FIG. 6, may be subject to less (or at least less external) interference than the unlicensed frequency band.

In 712, one or the other (or possibly both) of the BS 102 or the UE 106 may transmit a contention control message on the second channel (or on a channel of the second wireless communication technology corresponding in frequency to the second channel). The contention control message may be transmitted prior to at least one communication between the UE 106 and the BS 102 via the secondary carrier. The contention control message may be in a format according to a second wireless communication technology, and may be transmitted using signals according to the second wireless communication technology. For example, the contention control message may be a Wi-Fi clear-to-send (CTS) message.

One or both of the BS 102 and the UE 106 may be equipped with (or communicatively coupled with) wireless communication circuitry capable of communicating according to the second wireless communication technology. For example, as previously noted, the BS 102 may be equipped with Wi-Fi communication circuitry; additionally or alternatively, the UE 106 may be equipped with Wi-Fi communication circuitry.

Use of such a contention control message on a channel in an unlicensed frequency band may deter other devices which might otherwise communicate on that channel (and thereby cause interference to communication between the UE 106 and the BS 102) from communicating for a period of time. For example, the contention control message may include a duration value which may indicate to devices capable of operating according to the second wireless communication technology of a period of time for which the medium (e.g., channel) may be occupied. Having such knowledge as a result of the contention control message, such devices may refrain from communicating (e.g., according to the second wireless communication technology) on that particular channel until after the specified period of time has passed.

In 714, the UE 106 and the BS 102 may communicate via the secondary carrier. This may include transmission of uplink data (i.e., from the UE 106 to the BS 102) and/or downlink data (i.e., from the BS 102 to the UE 106), and may be performed according to scheduling configured by the BS 102 and communicated to the UE 106 via the primary carrier (i.e., as part of cross-carrier scheduling, such as previously described herein).

Note that once the secondary carrier is active the UE 106 and/or the BS 102 may monitor one or more link quality metrics (e.g., signal strength and/or quality metrics such as RSRP and/or RSRQ, packet loss rate, etc.) of the secondary carrier. Results of such monitoring by the UE 106 may be reported to the BS 102 (e.g., in a link quality report) via the primary cell. Note that such monitoring and reporting may be controlled/configured by the BS 102 (e.g., using indications/requests transmitted via the primary cell) and/or may be performed by the UE 106 in a manner controlled by the UE 106. Note additionally that such monitoring and reporting may be time based (e.g., periodically performed at certain preconfigured or dynamically configured intervals), event based (e.g., activated by certain events), or a combination of time based and event based. The BS 102 may additionally monitor (e.g., re-assess) the remainder of the unlicensed frequency band (or some portion thereof) occasionally (e.g., periodically or aperiodically).

Based at least in part on the link quality of the secondary carrier (e.g., as measured/reported by the UE 106 and/or as measured by the BS 102) and/or re-assessment of channel conditions of other channels of the unlicensed frequency band, the BS 102 may determine whether or not to initiate handover from the secondary carrier. As some point, the link quality of the second channel may fall below a desired level. In such a case, the BS 102 may determine to handover the secondary carrier to a different channel, and may select to which channel the secondary carrier is handed over. Determining that the link quality of the second channel has deteriorated may be performed in any of a variety of ways; as one example, if any monitored link quality metrics fall below a pre-configured threshold, this may be consideration that link quality of the second channel has deteriorated to an undesirable level. In such a situation, the BS 102 may determine to switch or hop the secondary carrier to another channel, which may or may not be on the unlicensed frequency band. The BS 102 may then provide a handover command (which may simply include an "Scell Drop" command for the second channel and an "Scell Add" command for the new channel of the secondary carrier, e.g., if the new channel has already been configured as one of the channels in the list of potential channels, or may be performed in any of various other ways) via the primary cell to the UE 106.

Once the UE 106 has received an indication to perform handover, with details of the handover, the UE 106 may perform handover (e.g., according to the provided details in the indication). After handover, the BS 102 and the UE 106 may continue to communicate on the secondary carrier, but the secondary carrier may be established on a different channel than previously.

Thus, according to the scheme of FIG. 7, a wireless device may be able to communicate with a cellular network on a carrier aggregation communication link for which at least one of the component carriers is on a licensed frequency band and at least one of the component carriers is on an unlicensed frequency band. This may potentially expand the throughput available to the wireless device, as use may be made of underutilized/available unlicensed portions of the RF spectrum in addition to frequency bands licensed by the cellular service provider of the wireless device.

Note additionally that while the method of FIG. 7 describes steps for establishing one component carrier on a licensed frequency band and one component carrier on an unlicensed frequency band, the method may be expanded and/or repeated as desired to provide a wireless device with a cellular communication link having any number of component carriers. For example, a cellular communication link having two or more component carriers in the licensed frequency band, two or more component carriers in the unlicensed frequency band, component carriers in more than two different frequency bands, and/or any of various other configurations are possible.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method, comprising:
at a mobile station:
establishing a primary carrier with a base station according to a cellular communication technology, wherein the primary carrier is on a licensed frequency band;
receiving, from the base station, configuration information of first and second secondary carriers, wherein the first and second secondary carriers are configured according to the cellular communication technology, wherein the first and second secondary carriers are on an unlicensed frequency band, and wherein the first and second secondary carriers are initially inactive;
performing one or more first measurements on at least the first secondary carrier;
providing the one or more first measurements to the base station;
receiving an activation indication for the first secondary carrier in response to providing the one or more first measurements;
performing one or more second measurements of at least the first secondary carrier;
providing the one or more second measurements to the base station; and
in response to providing the one or more second measurements, performing handover from the first secondary carrier to the second secondary carrier, wherein said performing handover comprises:
receiving a deactivation indication for the first secondary carrier; and
receiving an activation indication for the second secondary carrier.

2. The method of claim 1, wherein said performing the handover comprises receiving a handover command comprising the deactivation indication and the activation indication.

3. The method of claim 1, wherein performing handover from the first secondary carrier to the second secondary carrier is performed in response to at least one metric of the one or more second measurements falling below a threshold.

4. The method of claim 1, wherein the one or more first measurements comprise channel condition measurements.

5. The method of claim 1, wherein the one or more first measurements comprise one or more measurements of interference or signal strength.

6. The method of claim 1, wherein said receiving the activation indication for the first secondary carriers is in response to selection of the first secondary carrier based on one or more of: the one or more first measurements, feedback received from the mobile station, or network resource allocation.

7. The method of claim 1, wherein the one or more second measurements comprise one or more measurements of received signal code power (RSCP) and reference signal received quality (RSRQ).

8. The method of claim 1, wherein one or more the second measurements comprise link quality measurements.

9. The method of claim 1, wherein said providing the one or more second measurements is performed in response to an event.

10. An apparatus configured for inclusion in a mobile device, comprising:
one or more memory mediums storing program instructions;
one or more processing elements coupled to the one or more memory mediums, wherein the one or more processing elements are configured to execute the program instructions to:
establish a primary carrier with a base station according to a cellular communication technology, wherein the primary carrier is on a licensed frequency band;
receive, from the base station, configuration information of first and second secondary carriers, wherein the first and second secondary carriers are configured according to the cellular communication technology, wherein the first and second secondary carriers are on an unlicensed frequency band, and wherein the first and second secondary carriers are initially inactive;
perform one or more first measurements on at least the first secondary carrier;
provide the one or more first measurements to the base station;
receive an activation indication for the first secondary carrier in response to providing the one or more first measurements;
perform one or more second measurements of at least the first secondary carrier;
provide the one or more second measurements to the base station; and
in response to providing the one or more second measurements, perform handover from the first secondary carrier to the second secondary carrier, wherein said performing handover comprises:
receiving a de-activation indication for the first secondary carrier; and
receiving an activation indication for the second secondary carrier.

11. The apparatus of claim 10, wherein said performing the handover comprises receiving a handover command comprising the deactivation indication and the activation indication.

12. The apparatus of claim 10, wherein performing handover from the first secondary carrier to the second secondary carrier is performed in response to at least one metric of the one or more second measurements falling below a threshold.

13. The apparatus of claim 10, wherein the one or more first measurements comprise one or more measurements of interference or signal strength.

14. The apparatus of claim 10, wherein said receiving the activation indication for the first secondary carriers is in response to selection of the first secondary carrier based on one or more of: the one or more first measurements, feedback received from the mobile station, or network resource allocation.

15. The apparatus of claim 10, wherein the one or more second measurements comprise one or more measurements of received signal code power (RSCP) and reference signal received quality (RSRQ).

16. A wireless user equipment (UE) device, comprising:
a radio, comprising one or more antennas configured for wireless communication; and
a processing element operably coupled to the radio,
wherein the radio and the processing element are configured to:
establish a primary carrier with a base station according to a cellular communication technology, wherein the primary carrier is on a licensed frequency band;
receive, from the base station, configuration information of first and second secondary carriers, wherein the first and second secondary carriers are configured according to the cellular communication technology, wherein the first and second secondary carriers are on an unlicensed frequency band, and wherein the first and second secondary carriers are initially inactive;

perform one or more first measurements on at least the first secondary carrier;

provide the one or more first measurements to the base station;

receive an activation indication for the first secondary carrier in response to providing the one or more first measurements;

perform one or more second measurements of at least the first secondary carrier;

provide the one or more second measurements to the base station; and in response to providing the one or more second measurements, perform handover from the first secondary carrier to the second secondary carrier, wherein said performing handover comprises:

receiving a de-activation indication for the first secondary carrier; and     receiving an activation indication for the second secondary carrier.

17. The UE device of claim 16, wherein said performing the handover comprises receiving a handover command comprising the deactivation indication and the activation indication.

18. The UE device of claim 16, wherein performing handover from the first secondary carrier to the second secondary carrier is performed in response to at least one metric of the one or more second measurements falling below a threshold.

19. The UE device of claim 16, wherein said receiving the activation indication for the first secondary carriers is in response to selection of the first secondary carrier based on one or more of: the one or more first measurements, feedback received from the mobile station, or network resource allocation.

20. The UE device of claim 16, wherein the one or more second measurements comprise one or more measurements of received signal code power (RSCP) and reference signal received quality (RSRQ).

* * * * *